United States Patent [19]

Anderson

[11] 3,999,673
[45] Dec. 28, 1976

[54] BOAT LOADER

[76] Inventor: Edward C. Anderson, 356 West Lake, Long Lake, Minn. 55356

[22] Filed: Mar. 6, 1975

[21] Appl. No.: 555,965

[52] U.S. Cl. .......................... 214/450; 224/42.1 H
[51] Int. Cl.² ......................................... B60R 9/00
[58] Field of Search ............... 214/450; 224/42.1 H

[56] References Cited
UNITED STATES PATENTS

| 2,985,327 | 5/1961 | Gilkison | 214/450 |
|---|---|---|---|
| 3,128,893 | 4/1964 | Jones | 214/450 |
| 3,387,727 | 6/1968 | Micheel | 214/450 |
| 3,716,156 | 2/1973 | Risney | 214/450 |

Primary Examiner—Robert J. Spar
Assistant Examiner—Ross Weaver
Attorney, Agent, or Firm—Keith B. Davis

[57] ABSTRACT

A boat loader including a boom and an elongate traverse arm pivotally connected to the boom. A dolly bar carried on and for movement along the length of the traverse arm includes means for attachment to a boat. According to a preferred embodiment, a U-shaped boom is pivotally connected by the legs of the U to the rear bumper of a vehicle such as a camper or trailer. The length of the legs is slightly greater than the distance from the bumper to the top of the vehicle. The traverse arm is pivotally connected to the boom base midway between the legs and a spring is connected between the boom and traverse arm to normally maintain the traverse arm as a somewhat parallel extension of the traverse arm but which yields to permit pivoting of the traverse arm. With the boom lowered to a ground level position, the dolly bar positioned near the boom and fixedly attached across a boat (preferably near the boat longitudinal center of gravity), upon raising the boom to an elevated position and pivoting the traverse arm to a horizontal position, to likewise pivot the boat attached to the traverse arm by the dolly bar), the dolly bar may be caused to traverse along and to near the end of the traverse arm to position the boat over the vehicle. A forward carrier is provided which accepts the end of the traverse arm to hold down and secure the traverse arm for transit.

19 Claims, 5 Drawing Figures

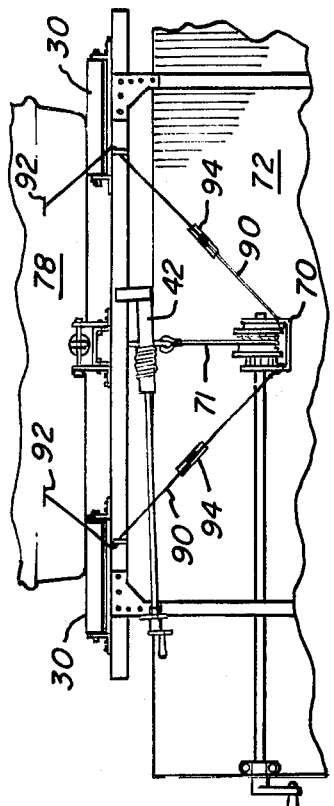
FIG. 3
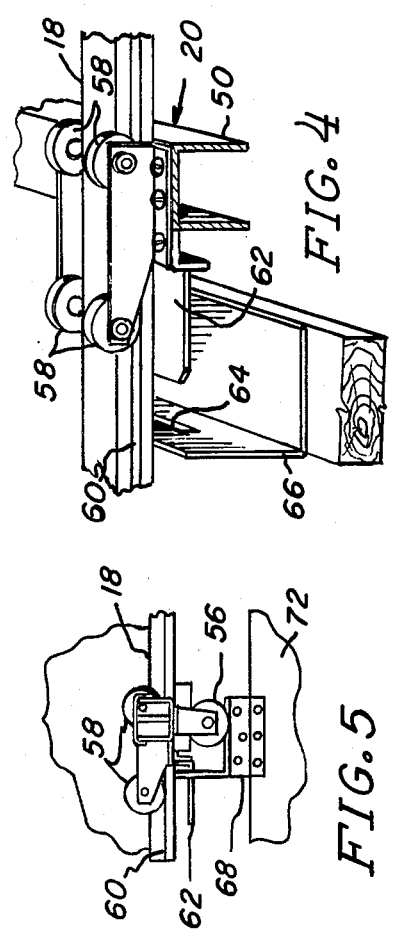
FIG. 4
FIG. 5
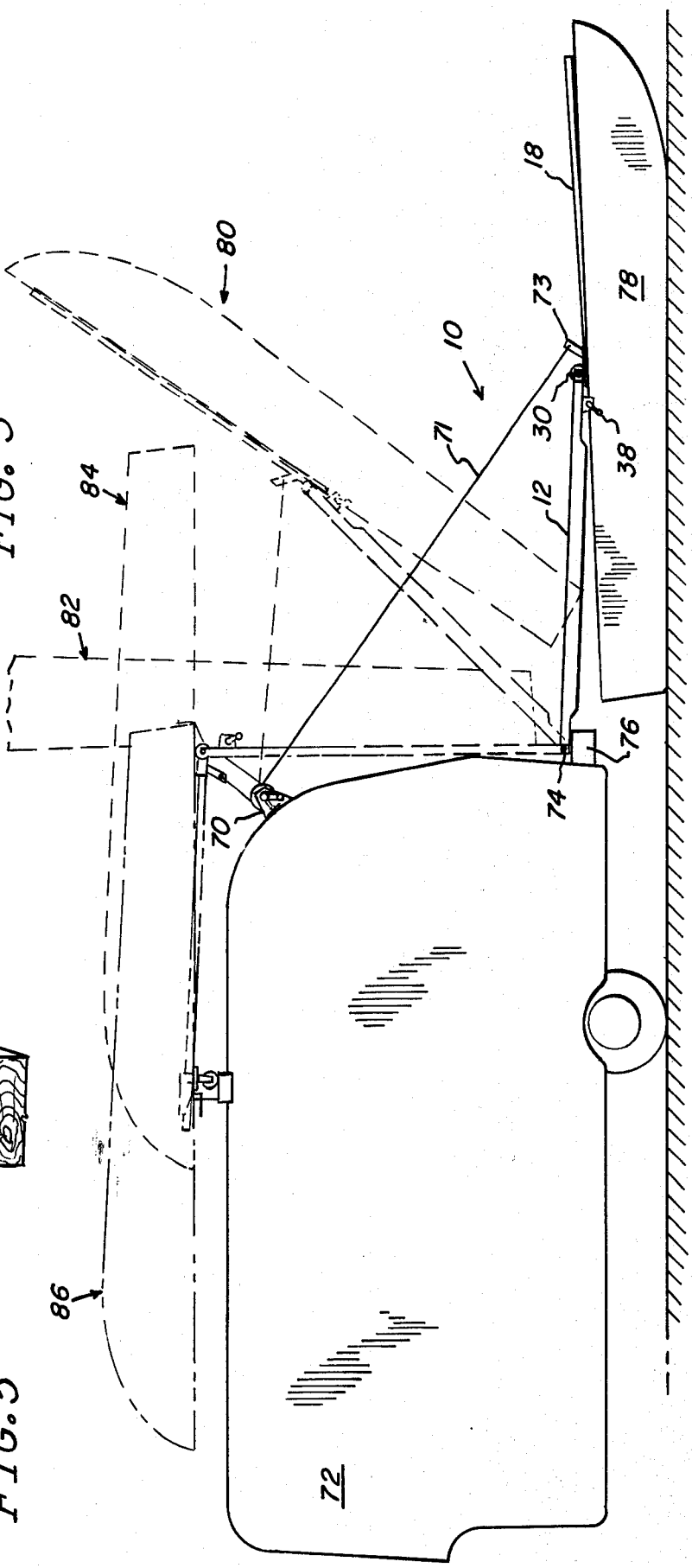
FIG. 2

BOAT LOADER

BACKGROUND and FIELD of the INVENTION

Briefly, the invention relates in general to that apparatus referred to as a boat loader and particularly to the species of boat loader employed for loading a boat onto a camper or trailer type vehicle, although the invention is also suitable for use with other types of vehicles as well.

Notwithstanding the vast and significant improvements and advances in boat materials and manufacturing technology which have greatly reduced the weight of fishing boats, loading a boat onto a vehicle is still a considerable problem. The problem increases with the heighth of a vehicle and vehicles most popular with fisherman are campers, trailers, and mobile homes which as a class are perhaps the highest of all vehicles in any significant numbers on which boats are commonly carried.

Numerous patents for inventions for boat loaders exist as testimonials to the many attempts made to solve the boat loading problem.

One such patent is U.S. Pat. No. 2,967,635 which issued Jan. 10, 1961 to F. H. Barnett for Boat Loading Device. Briefly, the Barnett device comprises support and load bearing means described in the patent as longitudinally extending and laterally spaced opposite side members 12 which extend from and attach to the rear bumper of an automobile and run angularly upwardly and slightly forwardly to about the top of the vehicle and thence forwardly approximately horizontally to a point of attachment on the vehicle roof. The side members are joined rigidly by cross members. Attached near the beginning of the portion extending upwardly angularly and forwardly is a loading boom, described in the patent as a vertically swinging loading frame. A pivotal extension from the frame, described in the patent as swinging legs, connect directly to the transom of a boat. A winch lifts the stern of a boat to swing upwardly first the legs and then the boom. This partially raises the boat above the vehicle. The boat is then manually moved the rest of the way over the vehicle.

Another style of boat loader specifically designed for a camper vehicle is disclosed in U.S. Pat. No. 3,696,953 which issued Oct. 10, 1972 to Sunyong P. Kim. Briefly, that invention comprises a hinged, suspension-like mechanism.

U.S. Pat. No. 3,777,922 issued Dec. 11, 1973 to Paul a Kirchmeyer for LOADER FOR ELEVATING A LOAD ONTO AN AUTOMOTIVE VEHICLE TOP. This invention includes a frame which is rigidly connected to a boat which is to be loaded. The frame is pivotally connected to the lower end of supporting links which hang vertically from the top of a vehicle onto which the boat is to be loaded. The upper end of the supporting links are in turn pivotally connected to slides which are housed within tracks secured to connected to slides which are housed within tracks secured to the vehicle top. A winch pulls the boat upright, until the frame is vertical and contiguous with the supporting links. Further operation of the winch produces conjoint tilting of the supporting links and frame until they reach a horizontal attitude whereupon the slides telescope into the tracks as the boat is pulled onto the vehicle top.

Various other types of boat loaders have been invented, including those of U.S. Pat. Nos. 3,435,970; 2,584,163; 3,478,908; 2,753,063; 2,808,952; 3,716,156; 2,985,327; 2,722,326; 3,612,314; and numerous others.

An object of the present invention is to provide a boat loader which is operable by a single person.

Another object of the present invention is to provide a boat loader which may be safely used even in a strong or gusty wind.

Yet another object of the present invention is a boat loader which is independent of and adjustable with respect to the heighth and width of the vehicle with which it is used.

A further object of the invention is a boat loader which may be used to load a variety of sizes of boats.

BRIEF DESCRIPTION OF INVENTION

Briefly, the invention comprises a loading boom, elongate traverse arm, a dolly bar and a winch having a line attached to the traverse arm, and, in a preferred embodiment of the invention, a front hold down carrier and a traverse reel. The dolly bar includes means for fixedly securing the bar across a boat, preferably near the longitudinal center of gravity of the boat for reasons which shall be explained later. The dolly bar is also adapted for travel along the length of the traverse arm, which traverse arm is pivotally attached as an extension of the loading boom. The loading boom is pivotally attached to a fulcrum such as the bumper of a vehicle and a spring is connected between the boom and traverse arm to normally maintain the traverse arm as a somewhat parallel extension of the traverse arm but which yields to permit pivoting of the traverse arm. The traverse reel is mounted to the boom base proximate the pivotal attachment of the traverse arm and includes a bow line and a stern line. To load a boat, the loading boom is lowered to ground level and the boat positioned with its stern close to and bow away from the vehicle and its longitudinal center of gravity at about the juncture of the boom and traverse arm. The dolly bar is fixedly attached to the boat. The bow line is about equal to the length of the boat, and the end of the line is attached to the boat bow; the balance of the bow line remains wound on the reel. The stern line the end of which is attached to the stern of the boat may be less than the length of the boat, and can be completely unwound as loading of the boat is started. The winch is wound up and the boom and traverse arm raised until the boom is nearly vertical. The boat is tilted to a horizontal position and the boom winched up to a fully vertical position which also advances the forward end of the traverse arm into the front hold down carrier where the traverse arm is secured. By operating the traverse reel to let out bow line and take up stern line, the dolly bar traverses the length of the traverse arm to complete loading of a boat.

BRIEF DESCRIPTION of DRAWINGS

FIG. 2 is a side plan view of the invention illustrated in FIG. 1; showing a boat at various stages of loading.

FIG. 3 is a rear plan view illustrating tie down of a loaded boat;

FIG. 4 is a side view of the front carrier portion of the invention; illustrating engagement of the reach 62 in front carrier hold down 66 for the boat fully loaded position;

FIG. 5 is a perspective view of portions of the traverse arm 18, dolly bar 20, and hold down 66.

IN FIG. 1, a preferred embodiment of a boat loader according to the present invention, shown generally as 10, is illustrated in perspective. Loader 10 includes a loading boom which for the preferred illustrated embodiment comprises a generally U-shaped frame having a pair of legs, 12 and 14, and a base 16. Loader 10 also includes a traverse arm 18 and a dolly bar shown generally as 20. Traverse arm 18 is pivotally attached to the loading boom base 16 by means of a pair of L-shaped brackets 22, one of which is hidden from view in FIG. 1. A bias means, coil spring 24 for the illustrated preferred embodiment, tends to maintain the traverse arm as a parallel extension of the boom which is important for reasons which will be set forth more fully hereinafter. Coil spring 24 is attached to traverse arm 18 by means of a hook 26 and to base 16 by means of spring retainer 28. Base 16 also carries thereon bearing means for contacting the gunnels of a boat in the form of a pair of rollers 30. Either rollers 30 are selected of sufficient length to accommodate boats of various widths, or, short rollers are employed but base 16 provided with a series of mounting holes for securing the brackets by which the rollers 30 are attached. Preferably, the longer rollers are employed to avoid undue weakening of base 16 which also includes a plurality of holes 32 for variable position attachment of base 16 to legs 12 and 14, by means of corner plates 34. Holes 32 permit selection of the width of the loading boom to accommodate variations in vehicles to which the loader is attached such as tail lights, signal lights, and doors. Base 16 also mounts dolly shuttle means in the form of a traverse reel shown generally as 36. Traverse reel 36 includes a crank handle 38, mounting axle 40 and drum 42 to which is attached a bow line 44 and stern line 46. Bow and stern lines 44 and 46 when attached to the bow and stern of a boat operate as indirect means for shuttle movement of the dolly bar 20. Dolly bar 20 also includes means 48 for fixedly attaching the dolly bar to the gunnels of a boat. Shuttle movement of the boat and dolly bar is promoted by the bearing means carried on dolly bar 20 in the form of the two pair of wheels 58 which travel in and provide low friction movement along raceways 60 of traverse arm 18. Like the loading boom frame, dolly bar 20 is constructed to be adjustable for as nearly universal use as possible. More specifically, dolly bar 20 is constructed of a centerpiece 50, and adjustable width outriggers, right outrigger 52, and left outrigger 54. Centerpiece 50 includes a series of apertures (not shown) to the left of the traverse arm and a like series of apertures (also not shown) to the right of the traverse arm which permit attachment of the outriggers at various distances from the centerpiece ends. Each outrigger is bolted to centerpiece 50 by a pair of bolts (not shown) through the centerpiece 50 holes corresponding to the width of the particular boat to be loaded. Wheels 56 near the outward end of each outrigger serve as stabilizing means for supporting the load of a boat on the top of a vehicle during transport or storage of a boat on top of a vehicle. Traverse arm 18 also carries thereon a reach 62 which cooperates with a slot 64 in hold-down 66 attached to a front carrier 66 to secure traverse arm 18 for transit. Boat loader 10 includes a winch 70 for raising and lowering the boom to move a boat between a lowered ground level position and an elevated position above a vehicle on which the boat is to be loaded. The winch 70 includes a winch line 71 which is attached to a winch line retainer 73 of traverse arm 18. The length of retainer and its position along the length of traverse arm 18 are important to optimum operation of the invention. If retainer 73 is too short or too close to base 16, too great a force is required to pivot traverse arm 18 from vertical; conversely, a retainer 73 too long or positioned too far from base 16 results in pivoting of traverse arm 18 before it and the boom reach a vertical position. Retainer 73 is therefore related to spring 24 which is selected to maintain traverse arm 18 as substantially a parallel extension of the lifting boom until the lifting boom has reached a fully vertical position.

FIG. 2 is a side view of the boat loader 10 of FIG. 1 shown attached to a trailer 72. As shown, leg 12 is attached by a boom mounting angle 74 to the trailer rear bumper 76. Bumper 76 serves as a fulcrum for boat loader 10. Leg 14, hidden from view in FIG. 2, is similarly attached to bumper 76.

To load a boat, the boat is positioned with its stern towards and bow away from the trailer 72. Loader 10 is lowered by its winch 70 until dolly bar 20 rests on the boat gunnels. If the longitudinal center of gravity of the boat is known, dolly bar 20 is fixedly attached a few inches or so forward (bowward) of the longitudinal center of gravity. If not known, the longitudinal center of gravity is determined and permanently located such as by drilling of a hole in the gunnels. The center of gravity can be determined by trial and error attachment of the dolly bar 20 and lifting the boat a few inches off the ground or by balancing the boat on a small raised surface placed cross-wise under the boat such as a 2 × 4. For the 12 foot aluminum boat used with the later described specific embodiment, gunnel holes were drilled about five inches forward of the center of gravity. At the time of fixedly attaching dolly bar 20, slightly forward of the longitudinal center of gravity as previously stated, the shuttle means 36 bow and stern lines are attached. The stern line 46 can be completely unwound and attached to the boat stern and preferably should be just long enough to reach from the drum 42 of shuttle means 36 to the boat stern. Bow line 44 must be almost as long as the length of boat 78, but only enough bow line 44 to reach from shuttle means 36 to the boat bow should be unwound from drum 42 when the bow line 44 is attached. By operating winch 70, a boat attached to the loader 10 is progressively raised from its initial lowered ground level position, through the partially raised position shown generally as 80 and indicated in phantom in FIG. 2, to a fully upright position, also indicated generally, and in phantom as 82. In the position indicated in 82, boat 78 is nearly vertical. If boat 78 had been attached to loader 10 too far rearward of the longitudinal center of gravity, there would be a danger of the boat pivoting counterclockwise rapidly and out of control to slam down onto and damage a vehicle roof as loading approached the 82 position. Also acting against such precipitous, uncontrolled downward pivoting is spring 24. (Spring 24 also prevents traverse arm 18 from slamming down onto a vehicle top when the loader 10 is returned to a fully loaded position without a boat attached.) As loading is continued, further operation of winch 70 pivots boat 78 to horizontal position 84 to align the reach 62 on traverse arm 18 for mating engagement with slot 64 of the hold down 66 on front carrier 68. Winch 70 is operated to draw winch line 71 taut and the winch is locked. FIG. 2 also illustrates that winch 70 is mounted slightly forward of the vertical position of boom legs 12 and 14. Such a forward position for the winch pull point (which could also be provided by a pully if the winch itself could not be so mounted) is necessary in order to pivot a boat 78 from position 82 to 84. Shuttle means 36 is operated by turning crank 38 to simultaneously let out bow line 44 and take up stern line 46 from and on drum 42 causing dolly bar 20 to traverse the length of traverse arm 18 and pull the boat forward over the trailer top into fully loaded position 86. In the fully loaded position, stabilizing wheels 56 are atop the front carrier 68 and the reach 62 attached to dolly bar 20 is fully engaged in slot 64. Shuttle means 36 is then locked to further secure the boat for transit, and additional tie downs of the boat are added as illustrated in FIG. 3.

In FIG. 3 a rear view of the trailer 72 with boat 78 in a fully loaded position, tie down means 90 are shown. Each tie down 90 includes attachment means 92 for attachment to a boat stern and adjustment means 94 for drawing the tie down taut.

FIG. 4 more clearly issustrates the construction of the dolly bar 20 wheels 58 and their assembly and reach 62. As shown, wheels 58 are attached to an angle iron which is in turn bolted to centerpiece 50. These wheel assembly angle irons are also bolted to another angle iron which is just forward of and abuts centerpiece 50. Reach 62 is also attached to this latter angle iron by bolts (hidden from view in FIG. 4) and is itself an angle iron.

FIG. 5 illustrates engagement of reach 62 of traverse arm 18 with the hold down means 66 of front carrier 68 for the boat fully loaded position, and further illustrates that in such position stabilizer wheels 56 are at rest on top of front carrier 68. So positioned, wheels 56 oppose any torque, such as from side winds on a boat, which otherwise would be applied to traverse arm 18. Wheels 56 are mounted for rotation only in a line parallel to traverse arm 18 and therefore also oppose linear sideways forces.

Figure 1:
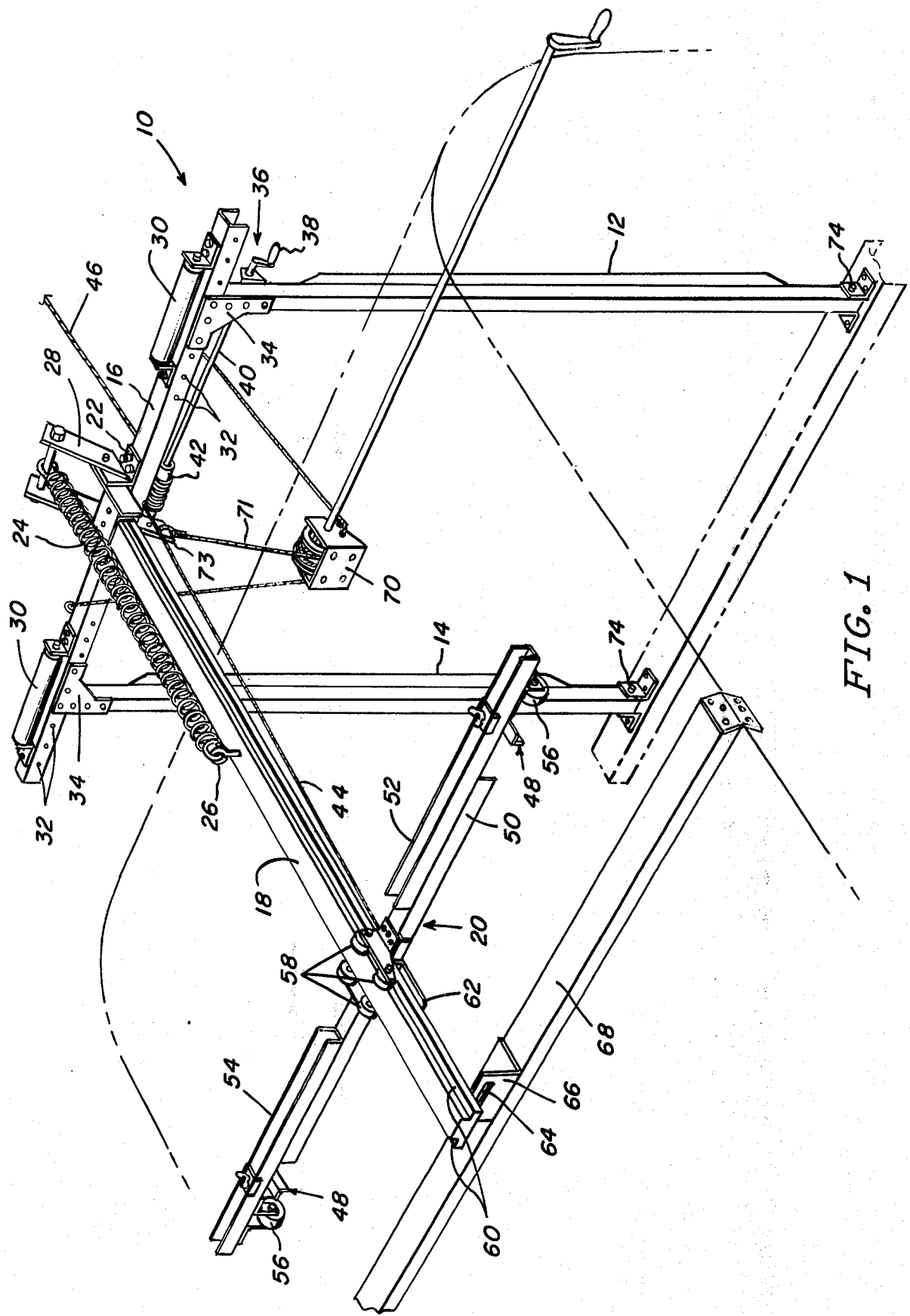
FIG. 1 is a perspective view of a boat loader according to the present invention illustrated with reference to a trailer to which the loader is shown attached.

The boat loader 10 of the preferred embodiment illustrated in and described with reference to FIGS. 1 through 5 has been constructed for use with a "Forester" 1968 Model, 15½ foot, trailer manufactured by the Forester Corporation, now the Kayot-Forester Corporation of Forest City, Iowa and a twelve foot aluminum fishing boat manufactured by the Sears-Roebuck Company, using the following components:

legs 12 and 14: five and one-half foot long length of 1½ ×1½ × ⅛ inch iron channel with about a four foot length of redwood 2 × 2 attached for rigidity, and including a pair of 1½ inch long 1½× ¼inch angle brackets secured to each leg by a ⅜ inch diameter case hardened machine bolt; the angle brackets each include a pair of ¼ inch diameter holes for attachment to a fulcrum, such as a vehicle bumper, by means such as ¼ ×¾ inch selftapping metal screws;

base 16: a seven foot length of 1½ × 1½ × ⅛ inch channel iron carrying a series of nine ⅜ inch diameter holes on 2 inch centers on both ends of one side to provide variable width spacing of the legs;

traverse arm 18: a 6 foot long length of redwood 2 × 4 into which a pair of ⅝ × ⅝ inch raceways (60) have been cut; the traverse arm carries a winch retainer fabricated from a seven inch length of ¼ × 1½ inch strap steel and four inch length of ¼ × 1½ × 1½ angle iron, the angle iron is bolted centered on and lengthwise to traverse arm 18, the strap steel is bolted to the angle iron at an anlge of 30° from normal to the traverse arm at a point three inches forward of the traverse arm pivot point, the centerline of a hole in the strap steel which is the point of connection for winch line 71 is 6 inches from traverse arm 18 measured along the strap steel;

dolly bar 20: Centerpiece 50 is a 3½ foot length of 1½ × 1½ inch ⅛ inch thick channel iron having a series of seven one-half inch diameter holes on 2 inch centers on each end of the bottom of the channel; each outrigger (52 and 54) is a two foot length of the same size channel with a similar series of one-half inch holes near their inner end (toward traverse arm 18) and have three ⅜ inch diameter holes about ½ inch, 1¼ inch and 1¾ inch from their outer end;

brackets 22: ¼ thick by 1½ × 2 inch angle iron nominally 3 inches long secured to base 16 by the 1½ inch angle side with three ¼ inch machine bolts; the bracket is secured so that the 2 inch angle side extends beyond base 16 by 1½ inches and a ⅜ inch diameter hole is included in this extension for passage therethrough of the pivot pin, the location of this ⅜ inch hole is important, it should be centered in the extension ¾inch from the end of the extension and from the base, and one inch from the top and from the bottom of the 2 inch side, the portion of the 1½ inch side which would otherwise also extend beyond base 16 is cut away to provide clearance for the spring retainer 28 as it pivots with arm 18 to a position approximately parallel with the boom; corner plate 34: ⅛ inch thick L-shaped boiler plate nominally a rectangle 7½ × 9 inches fabricated to remove excess non-functional metal.

shuttle means 36: conventional three inch handle connected to axle 40, a ½ inch diameter by about four foot length of conventional electrical conduit; the conduit is attached to one side of the channel iron of base 16 by the combination of a ¼ inch thick, one inch length of 1 × 2 inch angle iron and a conventional metal strap such as those used for securing electrical conduit; drum 42 is a one inch diameter by about one foot length of conventional electrical conduit overlapping and secured to the ½ inch conduit with a screw eye; a single length of ¼ inch rope is slipped through the screw eye and tied in a knot at the appropriated point to form bow line 44 and stern line 46.

attachment means 48: a gunnel support comprising a four inch length of ⅛ inch thick ¾ × ¾ angle, carrying a ⅜ inch diameter hole for securement with a ⅜ inch bolt which passes through the gunnel support, gunnel outrigger and a cap formed from a 2 inch length of 2 × 2 inch channel having the sides reduced to ½ inch, all of which is secured by a ⅜ inch wing nut.

stabilizing means 56: 2½ inch diameter by ½ inch wide hard rubber bearingless wheels secured by ⅜ inch bolts to brackets formed from a 1½ inch length of ¼ inch thick by 1 × 2 inch angle, each of which brackets is secured to an outrigger by a ⅜ inch bolt.

wheels 58 and assembly: each wheel is a 2 inch diameter, one-half inch wide, hard rubber, bearingless wheel, each pair of wheels is secured to a wheel assembly bracket fabricated from a ¼ inch thick 1½ × 2 inch angle iron nominally six inches long with two wheels mounted 5 inches apart on each 2 inch angle side by ⅜ inch bolts, the wheel mounting holes are about ½ inch down from the top of the 2 inch sides;

reach 62 and assembly: reach 62 proper, a 1½ inch length of 1 × 2 inch angle having the corners of the 2 inch side clipped to promote engagement of the reach in the slot 64; two ¼ inch diameter holes are provided in the one inch side for attachment of the reach to one side of a six inch length of ⅛ inch thick ¾ × ¾ angle iron the other side of which includes a pair of ¼ inch diameter holes for direct attachment to the wheel 58 assembly bracket and indirect attachment ( by the wheel assembly bracket) to the centerpiece of dolly bar 20.

holddown 66: a six inch length of ⅜ inch thick 3 × 3 inch angle including a 3 × ½ inch slot 64 in one side and three ¼ inch diameter holes in the other side for attachment of the holddown to front carrier 68 by 2½ inch long carriage bolts.

front carrier 68: a 7 foot long redwood 2 × 4 with ⅛ inch thick by 3 × 3 inch sheet steel plates attached to each end by three ¼ inch diameter by 1½ inch wood screws; one edge of each plate is flush with the four inch edge of the 2 × 4 to provide about a one inch overhang which includes three ¼ inch diameter holes for attachment to a vehicle such as a roof edge or reinforcement member of the vehicle structure.

winch 70: three to one ratio, rated to 700 pounds, with a ratchet lock and 6 inch handle, Sears and Roebuck Company part number 417-62-418; the winch handle is extended to the side of the vehicle by ¾ inch conduit;

tiedowns 90: ⅛ inch cable (90); 4 inch, ¼ inch turnbuckle (94); one inch O.D. by ¼ inch, screw eye (92); the cable is routed through one inch O.D., ¼ inch diameter eye bolts (no reference number) attached to base 16.

spring 24: a pair of 15 inch long coil springs of 34 gauge piano wire, ⅝ inch outside diameter, ten turns per inch, connected in parallel, and manufactured by the Associated Spring Corp. of Tulsa, Oklahoma;

eye bolt 26: ¼ × 2½ inch threaded eye bolt; secured through traverse arm 18 twenty nine inches forward of the pivot point;

spring retainer 28 and pivot strap: a pair of ¼ inch thick by 1½ × 7 inch pivot straps (no reference number) bolted by ⅜ inch bolts to each side of traverse arm 18 and having a three eighths diameter hole for passages therethrough of the pivot pin; the pivot strap extends beyond base 16 the same distance as the aforementioned extension of bracket 22 whereby the pivot strap extension serves as a stop by contacting the side of base 16 to limit groundward or clockwise pivoting of traverse arm 18; and, a pair of retainer straps of ¼ inch thick strap iron square on one end, 1½ inches wide and, 5½ inches long on one side and 7½ inches long on the other side, each retainer strap sandwiches a bracket 22 to a pivot strap with the retainer strap beveled end resting on bracket 22 to prevent pivotal movement of the strap; each retainer strap includes a ⅜ diameter hole near the beveled end of the strap for passage of the pivot pin, the square end of the retainer strap accepts a ⅜ inch bolt to which spring 24 is attached.

roller 30: 2 inch diameter by 12 inch long hard rubber roller having a ¾ inch diameter pintype case hardened bearing on each end; and, a pair of ¼ × 1½ × 2 inch mounting brackets having a ¾ inch diameter hole for accepting the pin-type bearing and a pair of ⅜ inch diameter holes for attaching the brackets to base 16.

It is to be understood that the foregoing is merely a description of the best manner of making and using the invention known to the inventor and is given by way of illustration and not limitation and that variations and modifications of the embodiment disclosed and described are within the true spirit and scope of the present invention. Specifically, for example, the U-shaped boom could be replaced with a T-shaped boom, a configuration particularly well-suited for a vehicle with a side door; a combination of an I shaped boom and T shaped traverse arm could be employed; the traverse arm could be provided with a protective collar such as a sleeve in the form of an open ended cylinder of rectangular cross-section fitted around the end pivotally connected to the boom; the boom legs could be constructed of telescoping sections to provide a loader useable with a variety of different heighth vehicles; the dolly bar wheels could be replaced with a skid having, and the raceways provided with, a low coefficient of friction surface, for example a teflon plastic surface; and, the traverse arm could be replaced with a hollow-monorail type traverse arm with the dolly bar bearing means contained within the rail. These and other modifications are deemed within the present invention the true scope of which is set forth in the following claims.

What is claimed is:

1. For a boat loader having a loading boom mountable to a fulcrum, which boom is for lifting a boat from a lowered ground position to an elevated position above a vehicle on which the boat is to be loaded, the improvement comprising an elongate traverse arm including at least one raceway along its length, and which traverse arm is pivotally connected to said boom; a dolly bar adapted for fixed attachment to a said boat and which includes bearing means for low friction movement along each said raceway of the traverse arm; and, bias means which tends to maintain said traverse arm as a somewhat parallel extension of said boom but which yields to pivot to an attitude approximately at right angles to said boom when said boom is approximately vertical in said elevatd position, whereby, with the boom in a lowered position and upon positioning the dolly bar near the end of the traverse arm connected to the boom and fixedly attaching the dolly bar to a boat, when the boom is raised to said elevated position, the traverse arm is pivoted to a horizontal attitude over a vehicle, and the dolly bar is moved to the other end of the traverse arm, said boat is likewise moved along the traverse arm to position the boat over the vehicle in a fully loaded position.

2. For a boat loader according to claim 1, the improvement wherein said bias means is a coil spring connected at one end to said boom and at another end to said traverse arm.

3. For a boat loader according to claim 2, the improvement further comprising:
   a front carrier including hold down means for securing said traverse arm and means adapted for attaching the front carrier to the top of said vehicle; and
   means carried on said traverse arm for mating engagement with said front carrier.

4. For a boat loader, according to claim 3, the improvement wherein said dolly bar includes a left and a right outrigger each of which extend outwardly from said traverse arm and each of which outriggers includes means for attachment to a boat near the outward end of said outrigger.

5. For a boat loader according to claim 4, the improvement further comprising:
   stabilizing means for opposing lateral and rotational in-transit forces transmitted to said traverse arm by the vehicle and boat to stabilize the load carried by said traverse arm.

6. For a boat loader according to claim 5, the improvement wherein said stabilizing means comprises a stabilizing wheel carried on and near the outward end of each said outrigger, wherein said front carrier substantially spans the width of a said vehicle and supports each said stabilizing wheel when a said boat is in a fully loaded position, and each of which stabilizing wheels is mounted for rotation only along a path substantially parallel to said elongate traverse arm.

7. For a boat loader according to claim 2, the improvement wherein said winch is attached to said traverse arm slightly forward of the pivotal connection of said traverse arm and said boom.

8. For a boat loader according to claim 7, the improvement wherein said boom further comprises a spring retainer proximate where said traverse arm and said base are pivotally connected, said spring comprises a pair of 15 inch long coil springs connected between said spring retainer and said traverse arm, and said traverse arm further comprises a winch line retainer extending a short distance from said traverse arm.

9. A boat loader comprising, in combination
A. a boom having a pair of ends, one of which ends is adapted for attachment to a fulcrum;
B. an elongate traverse arm having a pair of ends and at least one raceway extending between said ends, one of which ends is adapted for attachment to a fulcrum;
C. winch means for controlling raising and lowering of said boom between a lowered ground level position to an elevated position above a vehicle; and,
D. a dolly bar adapted for fixed attachment to a boat and including bearing means for low friction movement along the length of said traverse arm; and,
E. bias means which tends to maintain said traverse arm as a somewhat parallel extension of said boom but which yields to pivot to an attitude approximately at right angles to said boom when said boom is approximately vertical in said elevated position.

10. A boat loader according to claim 9, wherein said boom comprises a generally U-shaped frame having a pair of legs and a base, which legs comprise said boom end adapted for attachment to a fulcrum and which base comprises said boom end connected to said traverse arm.

11. A boat loader according to claim 10, wherein said legs are adapted for pivotal connection to a bumper of a vehicle such as a trailer or camper, have a length slightly greater than the distance between said bumper and a top of a said vehicle, and are spaced apart a width approximately equal to the width of a said vehicle.

12. A boat loader according to claim 10, wherein said base carries thereon a pair of bearing means positioned for contact with the gunnels of a boat as a boat is pushed over said vehicle top.

13. A boat loader according to claim 12, wherein said bearing means comprise a pair of rollers.

14. A boat loader according to claim 9, wherein said winch means comprises means adapted for attachment to said vehicle proximate to said fulcrum.

15. A boat loader according to claim 14, wherein
said boom comprises a generally U-shaped frame having a pair of legs and a base, which legs comprise said boom end adapted for attachment to a fulcrum and which base comprises said boom end connected to said traverse arm; and,
said winch comprises a drum having a crank and carrying on the drum a line, a length of which line extends from the drum and is connected to said traverse arm near where the traverse arm and said boom are joined, and which winch is adapted for mounting near the top of a said vehicle.

16. A boat loader according to claim 15, further comprising traverse locomotion means for moving said dolly bar along said traverse arm.

17. A boat loader according to claim 16, wherein said traverse locomotion means comprises a traverse reel including a stern line and a bow line, which bow line is approximately as long as said boat and which stern line is about at least as long as the distance from the stern of the boat to the longitudinal center of gravity of the boat and which traverse reel is attached to said boom base.

18. A method of loading a boat on top of a vehicle by means of a boat loader including a lifting boom and hold down means, comprising the steps of:
1. determining the longitudinal center of gravity of said boat;
2. aligning said boat in an upright position adjacent a said vehicle with one end of said boat towards and the other end away from a said vehicle;
3. attaching said lifting boom to said boat at about its longitudinal center of gravity;
4. lifting said boat until the lifting boom is vertical and said boat's point of connection to said lifting boom is slightly above and nearly adjacent the top of said vehicle;
5. pivoting said boat to an upside down position partially over the top of said vehicle; 6. moving said boat relative to said lifting boom connection point substantially completely over the top of said vehicle; and,
7. securing said boat to said hold down.

19. A boat loader according to claim 18 wherein said step (3) comprises attaching said lifting boom slightly removed from said center of gravity in a direction away from said vehicle whereby during said step (4) said boat ends away from and towards said vehicle respectively rise faster and slower than the point of attachment of the boat to said lifting boom to orient sail boat in a near vertical attitude; and said step (5) comprises orienting said boat from said vertical attitude to a horizontal, up-side down attitude.

* * * * *

UNITED STATES PATENT OFFICE
CERTIFICATE OF CORRECTION

Patent No. 3,999,673    Dated December 28, 1976

Inventor(s)  Edward C. Anderson                Page 1 of 2

It is certified that error appears in the above-identified patent and that said Letters Patent are hereby corrected as shown below:

IN THE DRAWINGS
- the Figure numbered Figure 4 should be numbered Figure 5;
- the Figure numbered Figure 5 should be numbered Figure 4;

IN THE DESCRIPTION
- in the seventh from the last line of the abstract, the parentheses "(" has been omitted;
- in Column 1, line 39, "connect" should be plural "connects";
- in Column 6, line 30, "corner plate 34" should be the start of a new paragraph;
- in Column 6, line 44, the last character of the line, "d", should be deleted to read "appropriate;

UNITED STATES PATENT OFFICE
CERTIFICATE OF CORRECTION

Patent No. 3,999,673  Dated December 28, 1976

Inventor(s) Edward C. Anderson  Page 2 of 2

It is certified that error appears in the above-identified patent and that said Letters Patent are hereby corrected as shown below:

IN THE CLAIMS

-Claim 9, Column 9, line 28 and line 27, the clause appearing in these lines should be deleted and replaced with the correct clause which reads as follows: "one of which traverse arm ends is pivotally connected to the other end of said boom;";

-Claim 18, Column 10, line 41, "6." should be the start of a new sub-paragraph.

Signed and Sealed this

Tenth Day of May 1977

[SEAL]

Attest:

RUTH C. MASON  
Attesting Officer

C. MARSHALL DANN  
Commissioner of Patents and Trademarks